United States Patent
Heim et al.

(10) Patent No.: US 7,589,746 B2
(45) Date of Patent: Sep. 15, 2009

(54) OPTIMIZED FRUSTUM CLIPPING VIA CACHED CLIP VERTICES

(75) Inventors: Oliver A. Heim, Cameron Park, CA (US); Stephen Junkins, Bend, OR (US)

(73) Assignee: Intel Corporation, Santa Clara, CA (US)

(*) Notice: Subject to any disclaimer, the term of this patent is extended or adjusted under 35 U.S.C. 154(b) by 301 days.

(21) Appl. No.: 11/388,322

(22) Filed: Mar. 23, 2006

(65) Prior Publication Data

US 2007/0222795 A1    Sep. 27, 2007

(51) Int. Cl.
*G09G 5/00*    (2006.01)

(52) U.S. Cl. .................. 345/623; 345/420; 345/423

(58) Field of Classification Search .......... 345/620–628
See application file for complete search history.

(56) References Cited

U.S. PATENT DOCUMENTS

| | | | | |
|---|---|---|---|---|
| 5,357,599 A * | 10/1994 | Luken | ......... | 345/627 |
| 5,764,243 A * | 6/1998 | Baldwin | ......... | 345/506 |
| 5,801,711 A * | 9/1998 | Koss et al. | ......... | 345/441 |
| 5,877,773 A * | 3/1999 | Rossin et al. | ......... | 345/621 |
| 6,047,088 A * | 4/2000 | van Beek et al. | ......... | 382/243 |
| 6,229,549 B1 * | 5/2001 | Smith | ......... | 345/419 |
| 6,356,271 B1 * | 3/2002 | Reiter et al. | ......... | 345/582 |
| 6,587,104 B1 * | 7/2003 | Hoppe | ......... | 345/423 |
| 6,734,853 B2 | 5/2004 | Heim et al. | | |
| 7,034,823 B2 * | 4/2006 | Dunnett | ......... | 345/422 |
| 7,038,684 B2 * | 5/2006 | Inoue et al. | ......... | 345/501 |
| 7,215,344 B2 * | 5/2007 | Baldwin | ......... | 345/620 |
| 7,292,242 B1 * | 11/2007 | Wittenbrink et al. | ......... | 345/421 |
| 7,315,310 B2 * | 1/2008 | Sakamoto et al. | ......... | 345/620 |
| 2004/0027348 A1 * | 2/2004 | Fenney | ......... | 345/421 |
| 2005/0030320 A1 * | 2/2005 | Munshi et al. | ......... | 345/620 |
| 2005/0093882 A1 * | 5/2005 | Cosman | ......... | 345/611 |
| 2005/0285850 A1 | 12/2005 | Heim et al. | | |
| 2007/0222795 A1 * | 9/2007 | Heim et al. | ......... | 345/621 |

OTHER PUBLICATIONS

Pending U.S. Appl. No. 11/108,989, filed Apr. 18, 2005, inventor: Junkins.
Pending U.S. Appl. No. 11/209,287, filed Aug. 22, 2005, inventor: Junkins.

* cited by examiner

*Primary Examiner*—Kee M Tung
*Assistant Examiner*—David H Chu
(74) *Attorney, Agent, or Firm*—Trop, Pruner & Hu, P.C.

(57) ABSTRACT

Apparatus, systems and methods for optimized frustum clipping via cached clip vertices are disclosed. For example, a method is disclosed, the method including generating a clip vertex for a leading edge of a triangle of a triangle strip or fan, indicating that the leading edge is shared with an adjacent triangle of the triangle strip or fan, and in response to the indication, using the clip vertex as a clip vertex of a trailing edge of the adjacent triangle in the triangle strip or fan. Other implementations are disclosed.

23 Claims, 5 Drawing Sheets

OPTIMIZED FRUSTUM CLIPPING VIA CACHED CLIP VERTICES

BACKGROUND

A typical 3D graphics system employs a pipelined data rendering scheme including two stages: a geometry stage, and a rasterizer stage. Rendering stages often include a collection of fixed function rendering units as well as more general purpose geometry and pixel processing units capable of employing "shaders" to perform specific rendering calculations. Applications or graphics drivers frequently use shaders in conjunction with the general purpose units to directly implement standard 3D pipeline rendering stages. For example, geometry stages commonly use fixed function clip set up units to determine, in a process known as "3D frustum clipping," which of the rendering primitives (e.g., points, lines, triangles) provided by the application or graphics driver will eventually be displayed. Such clipping is typically done in 3D space using a trapezoidal shaped view volume known as a view frustum. When a clip set up unit determines that a triangle primitive lies partially within the view frustum the unit will typically employ a clipper shader to calculate the points of intersection between the edges of that triangle and the view frustum and, ultimately, a new set of clip vertices lying at those points.

3D performance is frequently optimized by the use of triangle strip and/or fan primitives where two or more triangles share a common edge and thus have vertex information common to more than one triangle. When a typical geometry stage's clip set up unit or module undertakes frustum clipping for triangle strip and/or fan primitives the fact that edges are shared between triangles is ignored. This means that a typical clipper shader will undertake separate, redundant calculations for adjoining triangles generating two identical clip vertices along the shared edge between the triangles.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description specific details are set forth such as particular structures, architectures, interfaces, techniques, etc. in order to provide a thorough understanding of the various aspects of the claimed invention. However, such details are provided for purposes of explanation and should not be viewed as limiting. Moreover, it will be apparent to those skilled in the art, having the benefit of the present disclosure, that the various aspects of the invention claimed may be practiced in other examples that depart from these specific details. In certain instances, descriptions of well known devices, circuits, and methods are omitted so as not to obscure the description of the present invention with unnecessary detail.

Figure 1:
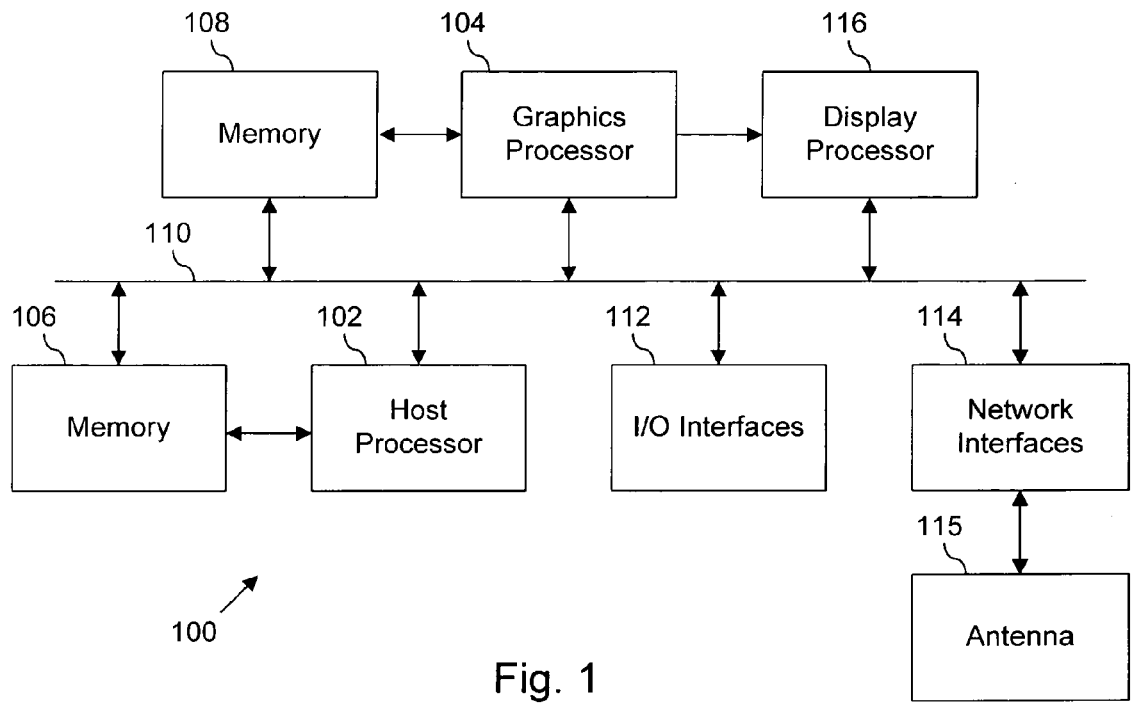
FIG. 1 illustrates an example graphics processing system in accordance with some implementations of the invention.

FIG. 1 illustrates an example system 100 according to some implementations of the invention. System 100 includes a host processor 102, a graphics processor 104, memories 106 and 108 (e.g., dynamic random access memory (DRAM), static random access memory (SRAM), flash, etc.), a bus or communications pathway(s) 110, input/output (I/O) interfaces 112 (e.g., universal synchronous bus (USB) interfaces, parallel ports, serial ports, telephone ports, and/or other I/O interfaces), network interfaces 114 (e.g., wired and/or wireless local area network (LAN) and/or wide area network (WAN) and/or personal area network (PAN), and/or other wired and/or wireless network interfaces), and a display processor and/or controller 116. System 100 may also include an antenna 115 (e.g., dipole antenna, narrowband Meander Line Antenna (MLA), wideband MLA, inverted "F" antenna, planar inverted "F" antenna, Goubau antenna, Patch antenna, etc.) coupled to network interfaces 114. System 100 may be any system suitable for processing 3D graphics data and providing that data in a rasterized format suitable for presentation on a display device (not shown) such as a liquid crystal display (LCD), or a cathode ray tube (CRT) display to name a few examples.

System 100 may assume a variety of physical implementations. For example, system 100 may be implemented in a personal computer (PC), a networked PC, a server computing system, a handheld computing platform (e.g., a personal digital assistant (PDA)), a gaming system (portable or otherwise), a 3D capable cellular telephone handset, etc. Moreover, while all components of system 100 may be implemented within a single device, such as a system-on-a-chip (SOC) integrated circuit (IC), components of system 100 may also be distributed across multiple ICs or devices. For example, host processor 102 along with components 106, 112, and 114 may be implemented as multiple ICs contained within a single PC while graphics processor 104 and components 108 and 116 may be implemented in a separate device such as a television coupled to host processor 102 and components 106, 112, and 114 through communications pathway 110.

Host processor 102 may comprise a special purpose or a general purpose processor including any control and/or processing logic, hardware, software and/or firmware, capable of providing graphics processor 104 with 3D graphics data and/or instructions. Processor 102 may perform a variety of 3D graphics calculations such as 3D coordinate transformations, etc. the results of which may be provided to graphics processor 104 over pathway 110 and/or that may be stored in memories 106 and/or 108 for eventual use by processor 104.

In one implementation, host processor 102 may be capable of performing any of a number of tasks that support 3D graphics processing. These tasks may include, for example, although the invention is not limited in this regard, providing 3D scene data to graphics processor 104, downloading microcode to processor 104, initializing and/or configuring registers within processor 104, interrupt servicing, and providing a bus interface for uploading and/or downloading 3D graphics data. In alternate implementations, some or all of these functions may be performed by processor 104. While system 100 shows host processor 102 and graphics processor 104 as distinct components, the invention is not limited in this regard and those of skill in the art will recognize that processors 102 and 104 possibly in addition to other components of system 100 may be implemented within a single IC.

Graphics processor 104 may comprise any processing logic, hardware, software, and/or firmware, capable of processing graphics data. In one implementation, graphics processor 104 may implement a 3D graphics architecture capable of processing graphics data in accordance with one or more standardized rendering application programming interfaces (APIs) such as OpenGL 2.0™ ("The OpenGL Graphics System: A Specification" (Version 2.0; Oct. 22, 2004)) and DirectX 9.0™ (Version 9.0c; Aug. 8, 2004) to name a few examples, although the invention is not limited in this regard. Graphics processor 104 may process 3D graphics data provided by host processor 102, held or stored in memories 106 and/or 108, and/or provided by sources external to system 100 and obtained over pathway 110 from interfaces 112 and/or 114.

Graphics processor 104 may receive 3D graphics data in the form of 3D scene data and process that data to provide image data in a format suitable for conversion by display processor 116 into display-specific data. In addition, graphics processor 104 may implement a variety of 3D graphics processing components and/or stages (not shown) such as an applications stage, a geometry stage and/or a rasterizer stage. Further, the geometry stage implemented by graphics processor 104 may include a fixed function clip set up module coupled to a shared return memory (SRM), such as memory 108, as will be described in greater detail below.

Bus or communications pathway(s) 110 may comprise any mechanism for conveying information (e.g., graphics data, instructions, etc.) between or amongst any of the elements of system 100. For example, although the invention is not limited in this regard, communications pathway(s) 110 may comprise a multipurpose bus capable of conveying, for example, instructions (e.g., macrocode) between processor 102 and processor 104. Alternatively, pathway(s) 110 may comprise a wireless communications pathway. In this way pathway 110 may couple together the components of system 100.

Antenna 115 may, in some implementations of the invention, receive or transmit information to or from system 100 where that information may include configuration data and/or image data. For example, configuration data and/or image data received by antenna 115 may, using interface 114 and pathway 110, be supplied processors 102, 104, and/or 116. The configuration data may be used to configure processors 102, 104, and/or 116 such that one or more of those processors may be enabled to undertake implementations of the invention. Image data received by antenna 115 may, in some implementations of the invention, include graphics data primitives such as primitives specifying triangle fans or triangle strips to be processed by graphics processor 104.

Display processor 116 may comprise any processing logic, hardware, software, and/or firmware, capable of converting image data supplied by graphics processor 104 into a format suitable for driving a display (i.e., display-specific data). For example, while the invention is not limited in this regard, processor 104 may provide image data to processor 116 in a specific color data format, for example in a compressed red-green-blue (RGB) format, and processor 116 may process such RGB data by generating, for example, corresponding LCD drive data levels etc. Further, the image data provided to processor 116 may be derived from triangle strips or fans and may include one or more clip vertices. Although FIG. 1 shows processors 104 and 116 as distinct components, the invention is not limited in this regard, and those of skill in the art will recognize that some if not all of the functions of display processor 116 may be performed by processor 104.

Figure 2:
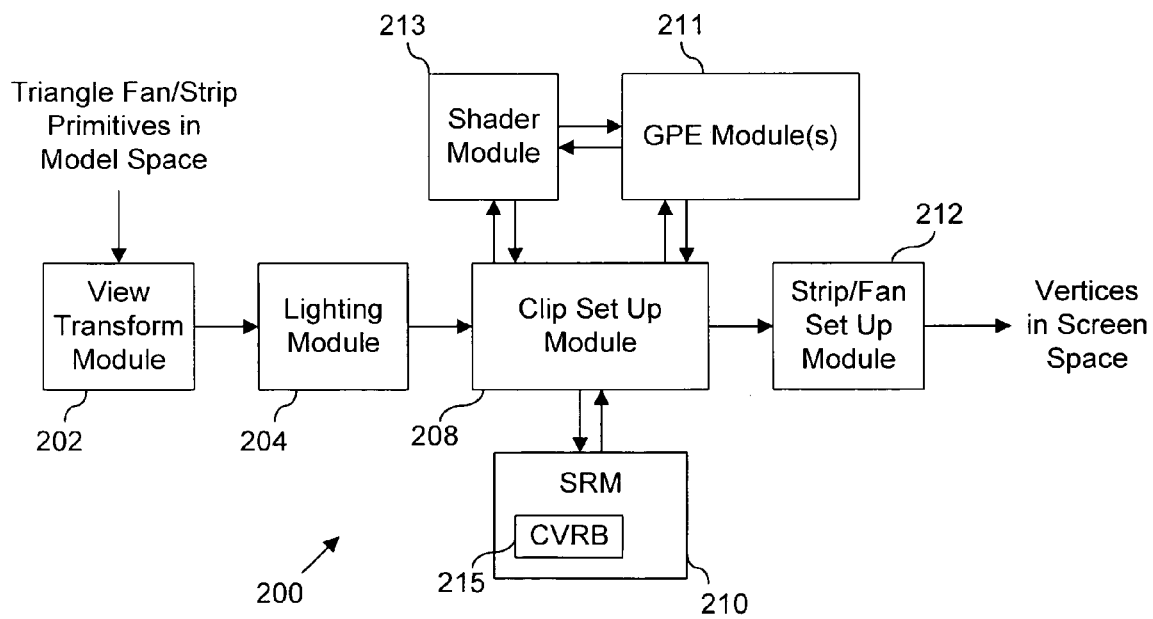
FIG. 2 illustrates portions of a geometry stage of a 3D graphics system in accordance with some implementations of the invention.

FIG. 2 is a simplified block diagram of portions of a geometry stage 200 of a 3D graphics system, such as might be implemented by processor 104 of system 100, in accordance with some implementations of the invention. Geometry stage 200 includes a view transform module 202, a lighting module 204, a clip set up module 208, a shared return memory (SRM) 210, and a strip/fan set up module 212. Transform, lighting, and strip/fan set up modules 202, 204, and 212 comprise typical implementations of such geometry stage modules and will not be discussed in any greater depth so as not to obscure the description of the invention with unnecessary detail.

Stage 200 also includes a one or more general purpose execution (GPE) module(s) 211 accessible by at least module 208 and capable of implementing geometry processing functions such as calculating clip vertex coordinates, etc. Stage 200 further includes a clipping shader module 213, employed or initiated by clip set up module 208 and capable of utilizing GPE module(s) 211 to undertake clipping of triangle edges. Shader 213 may further be capable of utilizing clip set up module 208 to access SRM 210 (i.e., to read or write data to or from SRM 210). Modules 208-213 may comprise any combination of hardware, firmware and/or software logic capable of implementing optimized frustum clipping via cached clip vertices in accordance with some implementations of the invention as will be explained in greater detail below.

Shared return memory (SRM) 210 may comprise any memory suitable for implementing storage of an indication or indicator of a shared edge relationship, condition or state in accordance with some implementations of the invention. Further, in accordance with some implementations of the invention, as will be explained in greater detail below, SRM 210, and, in particular, a shared edge relationship state indicator held therein, may be read/writeable by module 208 and/or shader 213. Thus, in some implementations of the invention, the shared edge relationship indicator may be a hardware data bit such as Clip Vertex Re-use Bit (CVRB) 215 held or stored in SRM 210 and configurable (i.e., settable or re-settable) by and/or accessible to module 208 and/or shader 213.

SRM 210 may, in some implementations of the invention, comprise cache memory internal to a graphics processor, such as processor 104, although the invention is not limited in this regard. Thus, for example, in another implementation, SRM 210 may comprise external memory, cache or otherwise, such as memory 108, coupled to graphics processor 104. In one implementation, SRM 210 may comprise the same memory used to store other information such as clip vertex coordinates, etc., although the invention is not limited in this regard.

In some implementations of the invention, clip set up module 208 may, in the process of undertaking frustum clipping for a triangle strip or fan, employ or implement shader module 213. Shader 213 may, although the invention is not limited in this regard, utilize general purpose GPE module(s) 211 to calculate or determine clip vertices and may store those clip vertices in SRM 210 as will be explained in greater detail below.

Figure 3A:
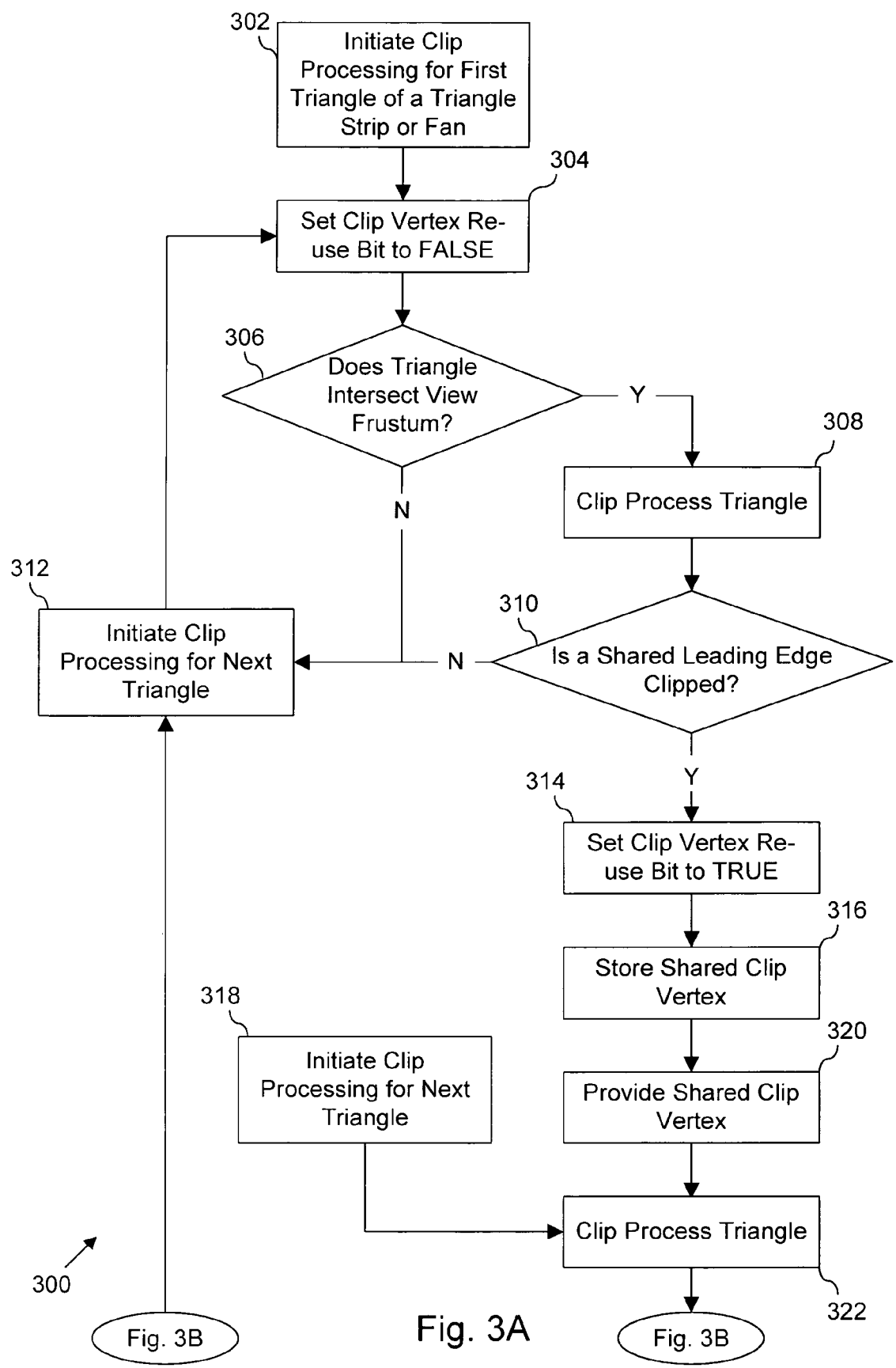
FIGS. 3A and 3B are flow charts illustrating an example process for optimizing frustum clipping via cached clip vertices in accordance with some implementations of the invention.
Figure 3B:
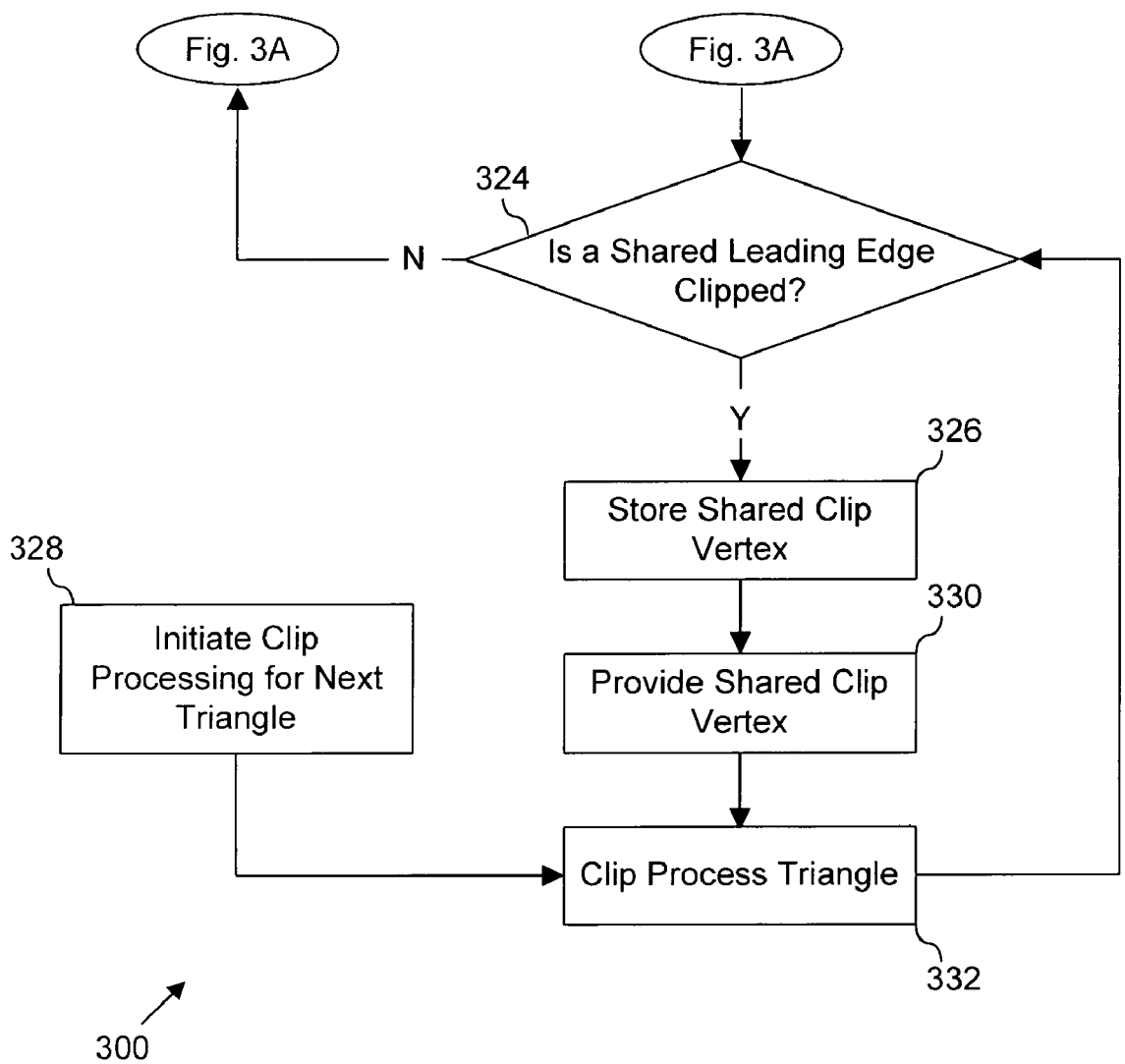

FIG. 3A is a flow chart illustrating a first portion of a process 300 for optimizing frustum clipping via cached clip vertices in accordance with some implementations of the invention. FIG. 3B is a flow chart illustrating further portions of process 300. While, for ease of explanation, process 300, and associated processes, may be described with regard to system 100 of FIG. 1, and geometry stage 200 of FIG. 2, the invention is not limited in this regard and other processes or schemes supported by appropriate devices in accordance with the claimed invention are possible. In addition, FIGS. 4A and B illustrate some representative geometric quantities for the clip processing of an example triangle strip 400 useful in aiding discussion of process 300. Further, FIG. 5 illustrates some representative geometric quantities useful for describing the clip processing of an example triangle edge 504.

Those skilled in the art will recognize that FIGS. 4A,B and 5 are intended merely as examples to aid in the following discussion of process 300 and the quantities and/or relationships shown therein should not be construed to limit the claimed invention in anyway. While process 300 will be discussed below with respect to implementations for optimizing frustum clipping via cached clip vertices in the context of triangle strips, such as strip 400, the invention is not limited in this regard and those skilled in the art will recognize that process 300 could be undertaken for the clip processing of triangle fans and/or polygon or quadrilateral strips or other structures sharing clipped edges in accordance with some implementations of the invention.

Figure 4A:
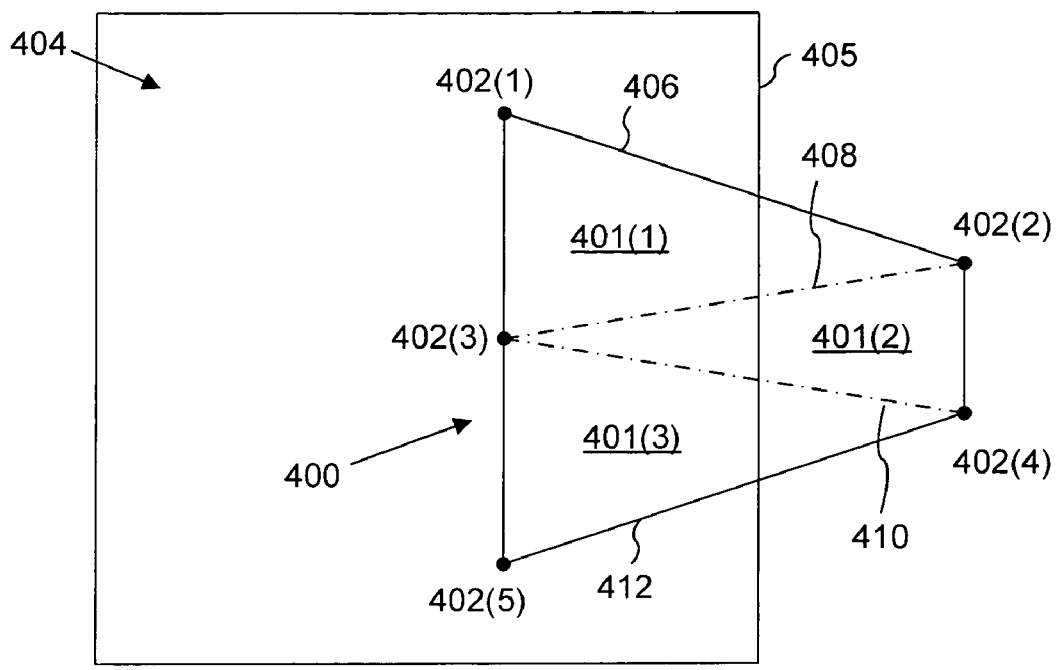
FIGS. 4A and 4B illustrate some representative geometric quantities for the clip processing of an example triangle strip.
Figure 4B:
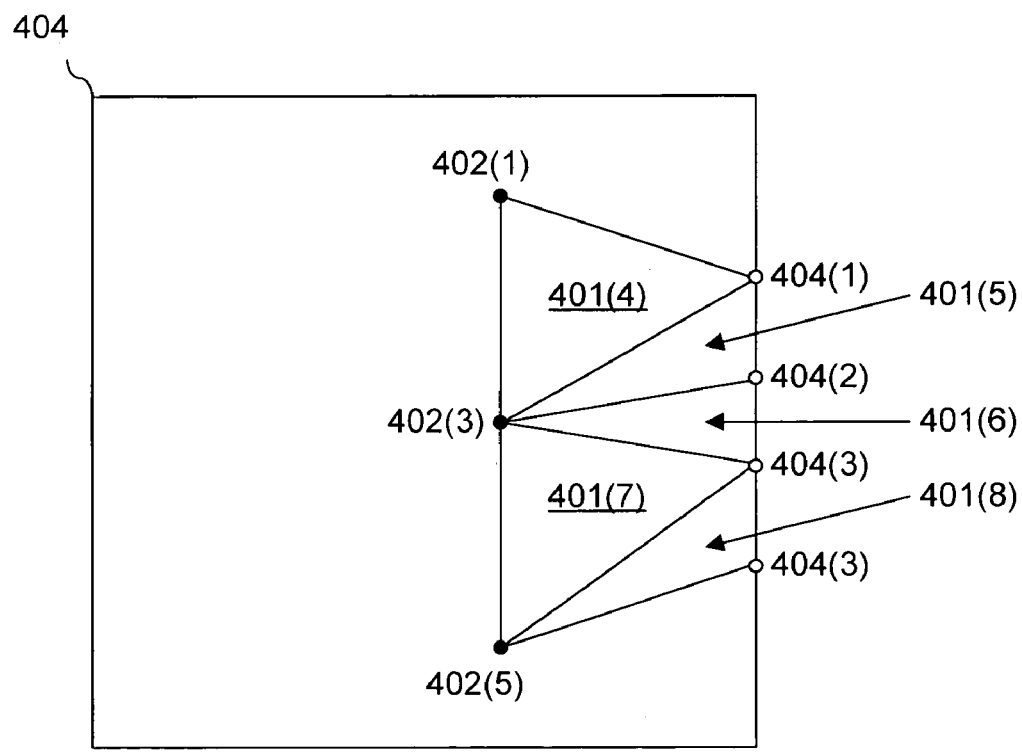
Figure 5:
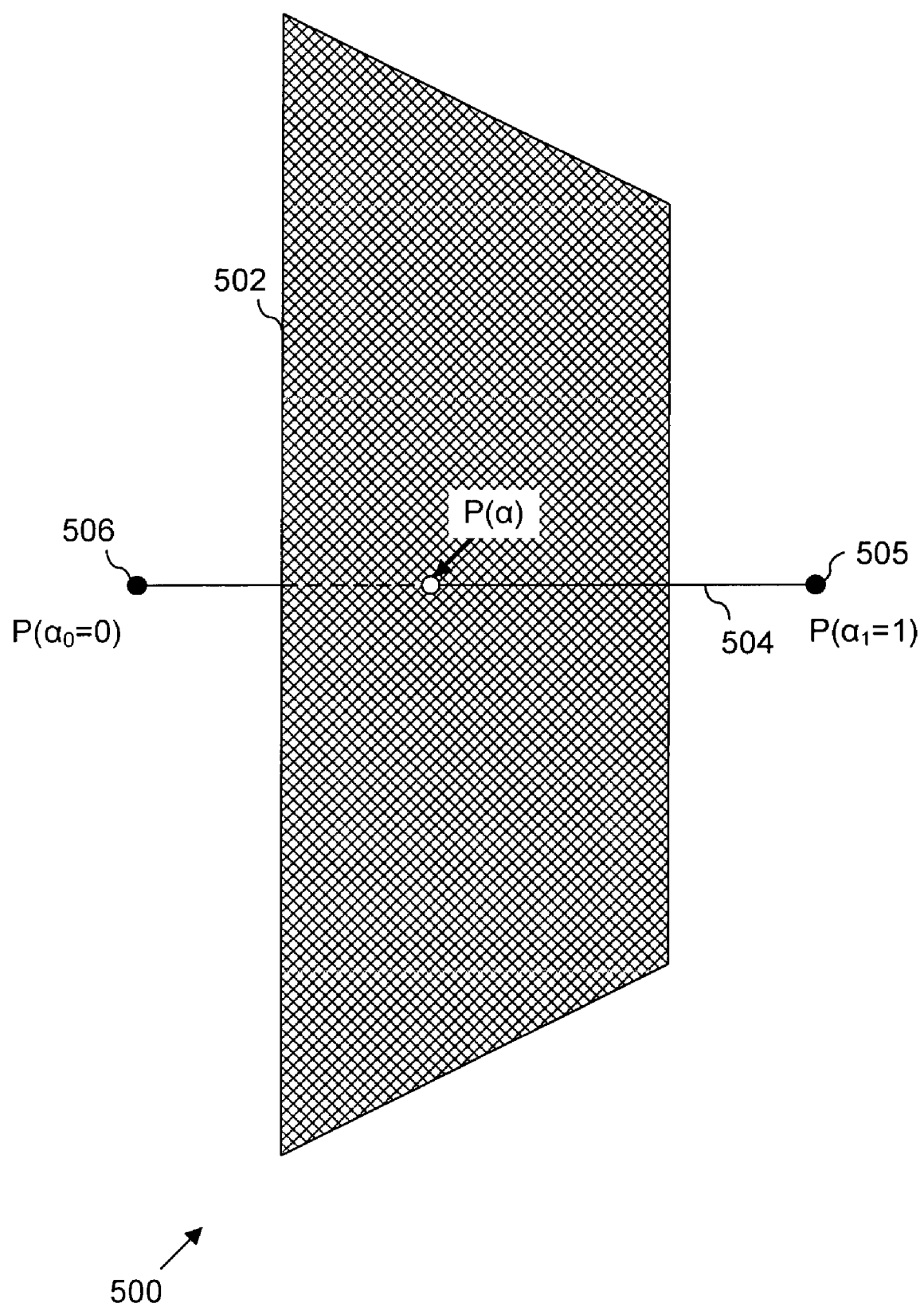
FIG. 5 illustrates some representative geometric quantities useful for describing the clip processing of an example triangle edge.

FIG. 4A shows that representative triangle strip 400 includes triangles 401(1)-401(3) defined by five vertices 402(1)-402(5) where triangle 401(1) is defined by vertices 402(1)-402(3), triangle 401(2) is defined by vertices 402(2)-402(4), and triangle 401(3) is defined by vertices 402(3)-402(5). Thus, all three triangles 401(1)-401(3) share vertex 402(3), while triangles 401(1) and 401(2) share vertex 402(2), and triangles 401(2) and 401(3) share vertex 402(4). Further, triangles 401(1) and 401(2) share an edge 408 defined by vertices 402(2) and 402(3), while triangles 401(2) and 401(3) share an edge 410 defined by vertices 402(3) and 402(4). Finally, triangle 401(2) may be described as being adjacent to triangle 401(1) and to triangle 401(3), while triangle 401(3) may be described as being adjacent to triangle 401(2).

The strip primitive data for strip 400 might also include coordinate data for vertices 402(1)-402(5) and connectivity data representing how vertices 402(1)-402(5) are connected together to form triangles 401(1)-401(3). For example, the primitive for strip 400 may list, in order, the coordinates of vertices 402(1) through 402(3) followed by subsequent vertices each of which is preceded by a vertex header specifying how each subsequent vertex connects to the previous vertex in the list. Those skilled in the art will recognize that edge 408 may be considered both the leading edge of triangle 401(1) and the trailing edge of triangle 401(2) and edge 408 may be considered a shared edge of triangles 401(1) and 401(2). Similarly, edge 410 may be considered both the leading edge of triangle 401(2) and the trailing edge of triangle 401(3) and edge 408 may be considered a shared edge of triangles 401(2) and 401(3). Moreover, those skilled in the art will recognize that view frustum 404 represents merely a stylized two-dimensional representation of a typical trapezoidal-shaped three-dimensional view frustum. As can be seen in FIG. 4A, a clip plane 405 of frustum 404 intersects triangles 401(1)-401(3).

Process 300 may begin with the initiation of clip processing for a first triangle of a triangle strip or fan [act 302]. In one implementation, clip set up module 208 may initiate clip processing upon receipt of a triangle strip or fan primitive from module 204. For example, clip set up module 208 may receive, from lighting module 204, the primitive specifying triangle strip 400 including the primitives for triangles 401(1)-401(3) and associated connectivity data.

Process 300 may continue with the setting of the clip vertex re-use bit to FALSE [act 304]. In other words, in some implementations of the invention, act 304 calls for an indicator of a shared clip vertex state (e.g., CVRB 215 of SRM 210) to be initialized (e.g., setting CVRB 215 to FALSE). In some implementations, clip set up module 208 may undertake act 304 by setting CVRB 215 to FALSE, although the invention is not limited in this regard and other components of stage 200, such as shader 213 may undertake act 304. In further implementations of the invention, act 304 may also be undertaken whenever a system reset, context switch, etc. occurs in system 100.

Process 300 may continue with a determination of whether the triangle intersects the view frustum [act 306]. In some implementations, clip set up module 208 may determine, based on a comparison of the coordinate space defined by the view frustum with the vertex coordinates of the triangle, whether any edge of the triangle intersects the view frustum. For example, referring to FIG. 4A, in undertaking act 306 for triangle 401(1) module 208 would determine that edges 406 and 408 intersect clip plane 405 and act 306 would yield a positive determination. If the determination of act 306 is negative, that is, if the triangle submitted in act 302 does not intersect the view frustum, then process 300 may continue with the initiation of clip processing for a next triangle [act 312] of the triangle strip or fan.

If the determination of act 306 is positive, that is, if the triangle does intersect the view frustum, then process 300 may continue with clip processing of that triangle [act 308]. In some implementations, clip set up module 208 may undertake act 308 by initiating or employing shader 213. In such event, act 308 may, for example, involve shader 213 obtaining triangle 401(1)'s primitive from clip set up module 208 where module 208 has obtained the primitive from SRM 210. Shader 213 may then use GPE modules 211 to calculate clip vertices for edges of that triangle. For example, Shader 213 may then use GPE modules 211 to calculate clip vertices for edges 406 and 408 of triangle 401(1) to complete act 308 where edge 408 is the leading edge of triangle 401(1).

With regard to undertaking act 308 on either edge 406 or 408, shader 213 in conjunction with GPE module(s) 211 may undertake calculating a clip vertex using well known techniques. For example, shader 213 may calculate the point at which edge 408 of triangle 401(1) intersects clipping plane 404. FIG. 5, provided specifically to aid in the discussion of act 308, illustrates representative quantities for a triangle edge 504 (e.g., edge 408) defined by vertices 505 and 506 (e.g., vertices 402(2) and 402(3)), intersecting a clip plane 502 of a view frustum, such as clip plane 405 of frustum 404, at a point P(α).

Those skilled in the art will recognize that the clip processing of act 308 includes the following well known calculations that may be undertaken by shader 213 in conjunction with GPE module(s) 211. For example, leading edge 504 can be described by the parametric line equation $$P(\alpha) = P0 + \alpha(P1 + P0) \qquad (1)$$

where P0 represents vertex 506 where α=0, P1 represents vertex 505 where α=1, and P(α) represents the point at which leading edge 504 intersects clip plane 502.

The intersection point P(α) may then be obtained by taking the dot product of equation (1) with the column vector representing clip plane 502 using the boundary conditions imposed by the frustum and solving for α

$$\alpha = [BC0_i/(BC0_i - BC1_i)] \qquad (2)$$

where i=[0.5] and BC0 and BC1 represent each of the six boundary planes of the trapezoidal view frustum. The value of α obtained from solving equation (2) may then be used in equation (1) to compute new vertex attribute values (position, color, texture coordinates, etc.) for the clip vertex at the point where leading edge 504 intersects clip plane 502. For example, referring again to FIGS. 4A and B, the result of act 308 for leading edge 408 of triangle 401(1) of strip 400 may be the generation of clip vertex 404(1) where edge 406 intersects clip plane 405 and clip vertex 404(2) where shared edge 408 intersects clip plane 405.

Process 300 may continue with a determination of whether a shared leading edge is clipped [act 310]. In some implementations of the invention, shader 213 may undertake act 310 with regard to the edge or edges clip processed in act 308. For example, in undertaking act 310 on triangle 401(1), shader 213 may determine that edge 406, while clipped, is not shared and that leading edge 408 is both clipped and shared by triangles 401(1) and 401(2). Hence, shader 213 may recognize edge 408 as a clipped shared edge. Further, shader 213 may undertake act 310 in response to connectivity data included in the primitive specifying the triangle. If the result of act 310 is negative, that is, if no shared leading edges were clipped in act 308, then process 300 may continue with the initiation of clip processing for a next triangle [act 312].

If the result of act 310 is positive, that is, if a shared leading edge is clipped in act 308, then, in some implementations of the invention, process 300 may continue with the setting of the clip vertex re-use indicator or bit to TRUE [act 314]. In some implementations, shader 213 may configure or set CVRB 215 in SRM 210 to TRUE to indicate that a shared clip vertex is available. Thus, continuing the example from above, when shader 213 calculates a clip vertex for edge 408 in act 308, shader 213 may set CVRB 215 to a TRUE state in act 314. While act 314, and other acts may be described as being undertaken by shader 213, those acts may be undertaken by shader 213 in conjunction with clip set up module 208. For example, although the invention is not limited in this regard, act 314 may be undertaken by having shader 213 use clip set up module 208 set CVRB 215 to a TRUE state.

Process 300 may continue with the storing or caching of the shared clip vertex [act 316]. In some implementations of the invention, shader 213 may store the shared clip vertex resulting from act 308 in SRM 210. Clearly, shader 213 may utilize module 208 to do so. The invention is not limited in this regard, however, thus, in alternative implementations, act 316 may involve shader 213 using clip set up module 208 to store the shared clip vertex elsewhere in system 100 (e.g., in external memory such as memory 108) and to store a pointer in SRM 210 where the pointer specifies the storage location of the shared clip vertex.

Process 300 may continue with the initiation of clip processing for a next triangle [act 318]. This may be done by having shader 213 obtain the next triangle's primitive from clip set up module 208. To do so module 208 may retrieve the next triangle's primitive from SRM 210. For example, act 318 may involve module 208 retrieving triangle 401(2)'s primitive from SRM 210 and providing that primitive to shader 213.

In addition to providing the next triangle's primitive in act 318, and in accordance with some implementations of the invention, process 300 also includes providing the shared clip vertex [act 320] to be re-used in clip processing the next triangle [act 322]. Thus, in some implementations of the invention, acts 318 and 320 may be undertaken by having clip set up module 208 check CVRB 215 when it provides the next triangle's primitive to shader 213 in act 318 and, if CVRB 215 indicates a shared edge state (e.g., when CVRB 215 has been set TRUE in act 314), then module 208 may also provide the shared clip vertex associated with the shared edge clipped in act 308 to shader 213 in act 320.

In some implementations of the invention, the shared clip vertex provided in act 320 may be placed in SRM 210. Alternatively, the shared clip vertex provided may be stored elsewhere in system 100 and act 320 may involve providing a pointer to that location. In other words, and for example, acts 318 and 320 may comprise module 208 providing shader 213 with the primitive for triangle 401(2) along with the shared clip vertex 404(2) or a pointer to where shared clip vertex 404(2) is stored or held.

In accordance with some implementations of the invention when the next triangle is clip processed in act 322 the shared clip vertex may be re-used as the clip vertex of the trialing edge of the next triangle. For example, when shader 213 undertakes clip processing of adjacent triangle 401(2) in act 322 it may re-use the shared clip vertex 404(2) as the clip vertex for shared trailing edge 408 rather than have GPE module(s) calculate a clip vertex for edge 408.

Referring to FIG. 3B, process 300 may continue with a determination of whether a shared leading edge of the triangle clip processed in act 322 is clipped [act 324]. Act 324 is similar to act 310 as described above. If the result of act 324 is negative, that is, if the leading edge of the triangle processed in act 322 is not both clipped and shared then process 300 may continue with act 312 (FIG. 3A). If the result of act 324 is positive, that is, if the leading edge of the triangle processed in act 322 is both clipped and shared then process 300 may continue with acts 326-332. It can be seen from FIGS. 3A/B acts 326-332 are similar to respective ones of acts 316-322 discussed above. Each subsequent triangle clip processed in act 332 having a clipped shared leading edge will result in another iteration of acts 326-332.

The acts shown in FIGS. 3A and 3B need not be implemented in the order shown; nor do all of the acts necessarily need to be performed. Also, those acts that are not dependent on other acts may be performed in parallel with the other acts. For example, acts 302 and 304 may be undertaken in parallel, or acts 318 and 320 may be undertaken in parallel. Further, at least some of the acts in this figure may be implemented as instructions, or groups of instructions, implemented in a machine-readable medium.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention. For example, while FIG. 2 and the accompanying text may show and describe a geometric stage 200 including one clip set up module 208, those skilled in the art will recognize that graphics processors in accordance with the invention may include geometric stages having more than one clip set up module 208 functioning in parallel. Clearly, many other implementations may be employed to provide rasterizer driven cache coherency consistent with the claimed invention.

No element, act, or instruction used in the description of the present application should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:
   determining in a graphics processor whether a triangle intersects a view frustrum;
   clip processing the triangle only if it intersects the view frustrum;
   determining whether there is a leading edge that is shared with an adjacent triangle of a triangle strip or triangle fan, which shared edge was clipped; and
   only if there was a shared leading edge that was clipped, using a shared clipped vertex as a clipped vertex of a trailing edge of the adjacent triangle.

2. The method of claim 1, wherein indicating that the leading edge is shared with an adjacent triangle comprises configuring at least one data bit.

3. The method of claim 2, further comprising:
   reconfiguring the at least one data bit after using the clip vertex as a clip vertex of a trailing edge of the adjacent triangle.

4. The method of claim 2, further comprising:
   storing the clip vertex in memory.

5. The method of claim 4, wherein the memory includes the indicator.

6. The method of claim 4, wherein in response to the indication, using the clip vertex as a clip vertex of a trailing edge of the adjacent triangle comprises:
   providing a pointer to a location where the clip vertex is stored.

7. An article comprising a machine-accessible medium having stored thereon instructions that, when executed by a machine, cause the machine to:
   determine whether a triangle intersects a view frustrum;
   clip process the triangle only if it intersects the view frustrum;
   determine whether there is a leading edge that is shared with an adjacent triangle of a triangle strip or triangle fan, which shared edge was clipped; and
   only if there was a shared leading edge that was clipped, use a shared clipped vertex as a clipped vertex of a trailing edge of the adjacent triangle.

8. The article of claim 7, wherein the instructions to indicate that the leading edge is shared, when executed by a machine, cause the machine to configure an indicator.

9. The article of claim 8, wherein the instructions to indicate that the leading edge is shared, when executed by a machine, cause the machine to set at least one data bit.

10. The article of claim 9, further having stored thereon instructions that, when executed by a machine, cause the machine to:
    reset the at least one data bit after using the clip vertex as a clip vertex of a trailing edge of the adjacent triangle.

11. The article of claim 8, further having stored thereon instructions that, when executed by a machine, cause the machine to:
    store the clip vertex in memory.

12. The article of claim 11, wherein the memory includes the indicator.

13. The article of claim 11, wherein the instructions to use the clip vertex as a clip vertex of a trailing edge of the adjacent triangle, when executed by a machine, cause the machine to:
    provide a pointer to a location where the clip vertex is stored.

14. An apparatus comprising:
    memory to store an indicator of a shared edge relationship between adjacent triangles within a view frustrum of one of a triangle strip or triangle fan; and
    a processor to determine whether a triangle intersects a view frustrum, clip process the triangle only if it intersects the view frustrum, determine whether there is a leading edge that is shared with an adjacent triangle of a triangle strip or triangle fan, which shared edge was clipped, and only if there was a shared leading edge that was clipped, use a shared clipped vertex as a clipped vertex of a trailing edge of the adjacent triangle.

15. The apparatus of claim 14, the memory to further store the clip vertex.

16. The apparatus of claim 14, the memory to further store a pointer, the pointer indicating a location where the clip vertex is stored.

17. The apparatus of claim 14, wherein the indicator comprises one or more data bits.

18. A system comprising:
    memory to store an indicator of a shared edge relationship between adjacent triangles within a view frustrum of one of a triangle strip or triangle fan;
    a graphics processor to determine whether a triangle intersects a view frustrum, clip process the triangle only if it intersects the view frustrum, determine whether there is a leading edge that is shared with an adjacent triangle of a triangle strip or triangle fan, which shared edge was clipped, and only if there was a shared leading edge that was clipped, use a shared clipped vertex as a clipped vertex of a trailing edge of the adjacent triangle; and
    a display processor at least capable of converting image data including the clip vertex into a format suitable for driving a display.

19. The system of claim 18, the memory to further store the clip vertex.

20. The system of claim 18, the memory to further store a pointer, the pointer indicating a location where the clip vertex is stored.

21. A system comprising:
    memory to store an indicator of a shared edge relationship between adjacent triangles of one of a triangle strip or triangle fan;
    a graphics processor to determine whether a triangle intersects a view frustrum, clip process the triangle only if it intersects the view frustrum, determine whether there is a leading edge that is shared with an adjacent triangle of a triangle strip or triangle fan, which shared edge was clipped, and only if there was a shared leading edge that was clipped, use a shared clipped vertex as a clipped vertex of a trailing edge of the adjacent triangle; and an antenna at least capable of receiving image data including data specifying the triangle strip or triangle fan.

22. The system of claim 21, the memory to further store the clip vertex.

23. The system of claim 21, the memory to further store a pointer, the pointer indicating a location where the clip vertex is stored.

* * * * *